Feb. 13, 1934.                M. L. DARR                1,946,614
                              HELICOPTER
                     Filed Dec. 21, 1931      3 Sheets-Sheet 1

INVENTOR.
Milford L. Darr.
BY Townsend & Loftus
ATTORNEYS.

Patented Feb. 13, 1934

1,946,614

UNITED STATES PATENT OFFICE 1,946,614

HELICOPTER

Milford L. Darr, Oakland, Calif.

Application December 21, 1931
Serial No. 582,267

5 Claims. (Cl. 170—163)

This invention pertains to helicopters and more particularly to improvements of helicopters of the type shown in my prior Patent No. 1,819,075, entitled "Helicopter" issued August 18, 1931.

The helicopter described in the above patent is one in which driving and lifting force is obtained by means of two sets of propeller blades revolving in parallel horizontal planes and in opposite directions. The blades in each set are capable of adjustment to vary their pitch during rotation so that either a driving or lifting force may be obtained at the will of the operator or when desired a driving or lifting force may be obtained simultaneously.

The present invention is particularly concerned with improved means for varying the pitch of the blades in a helicopter of this type and has for its object the provision of means for this purpose that would be simple in construction, relatively smooth and quiet in operation, as free from friction as reasonably possible and relatively inexpensive to manufacture.

One form which the invention may assume is exemplified in the following description and illustrated by way of example in the accompanying drawings in which.

Figure 1:
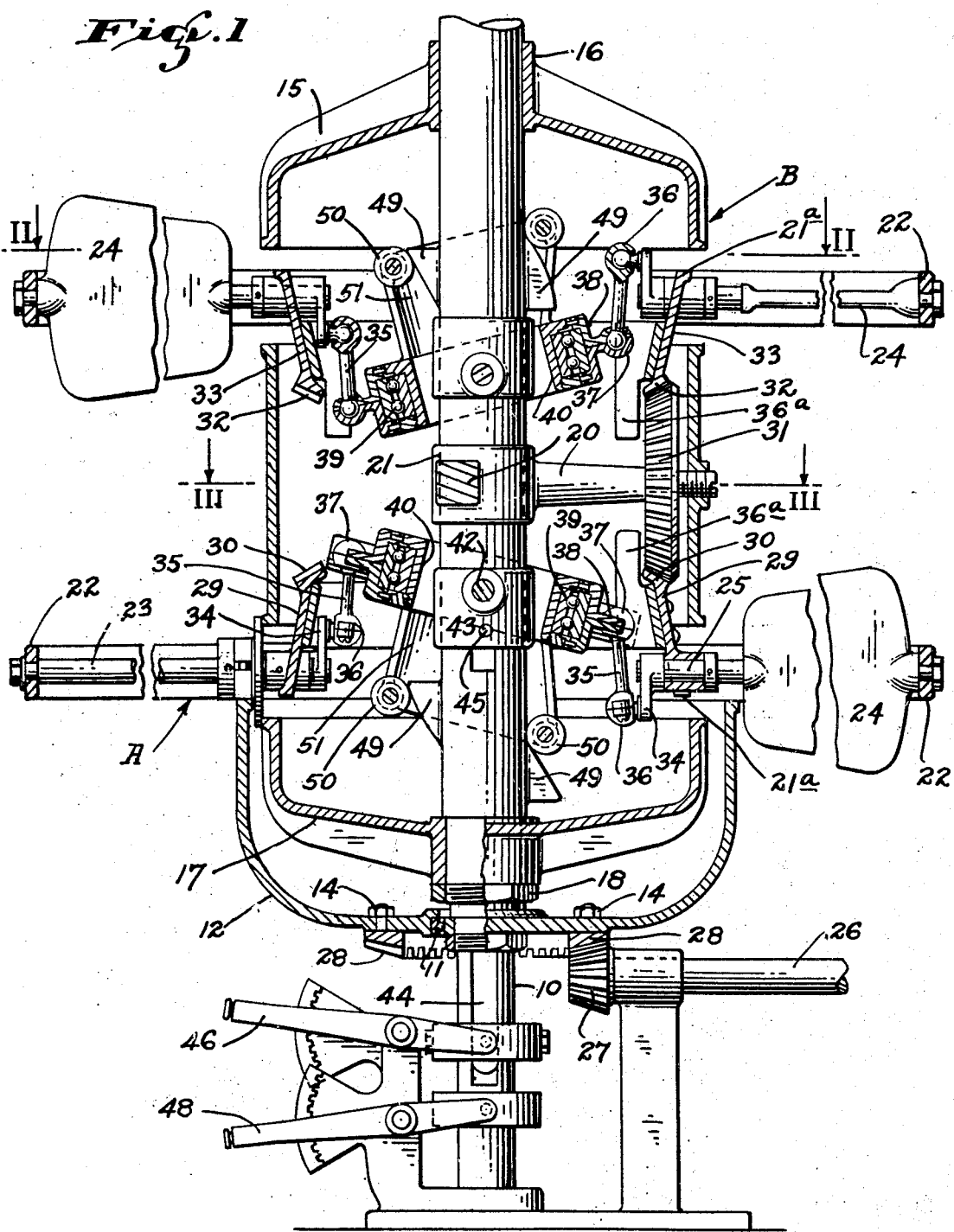
Fig. 1 is a central vertical section of the control means for the blades of a helicopter involving my invention.
Figure 2:
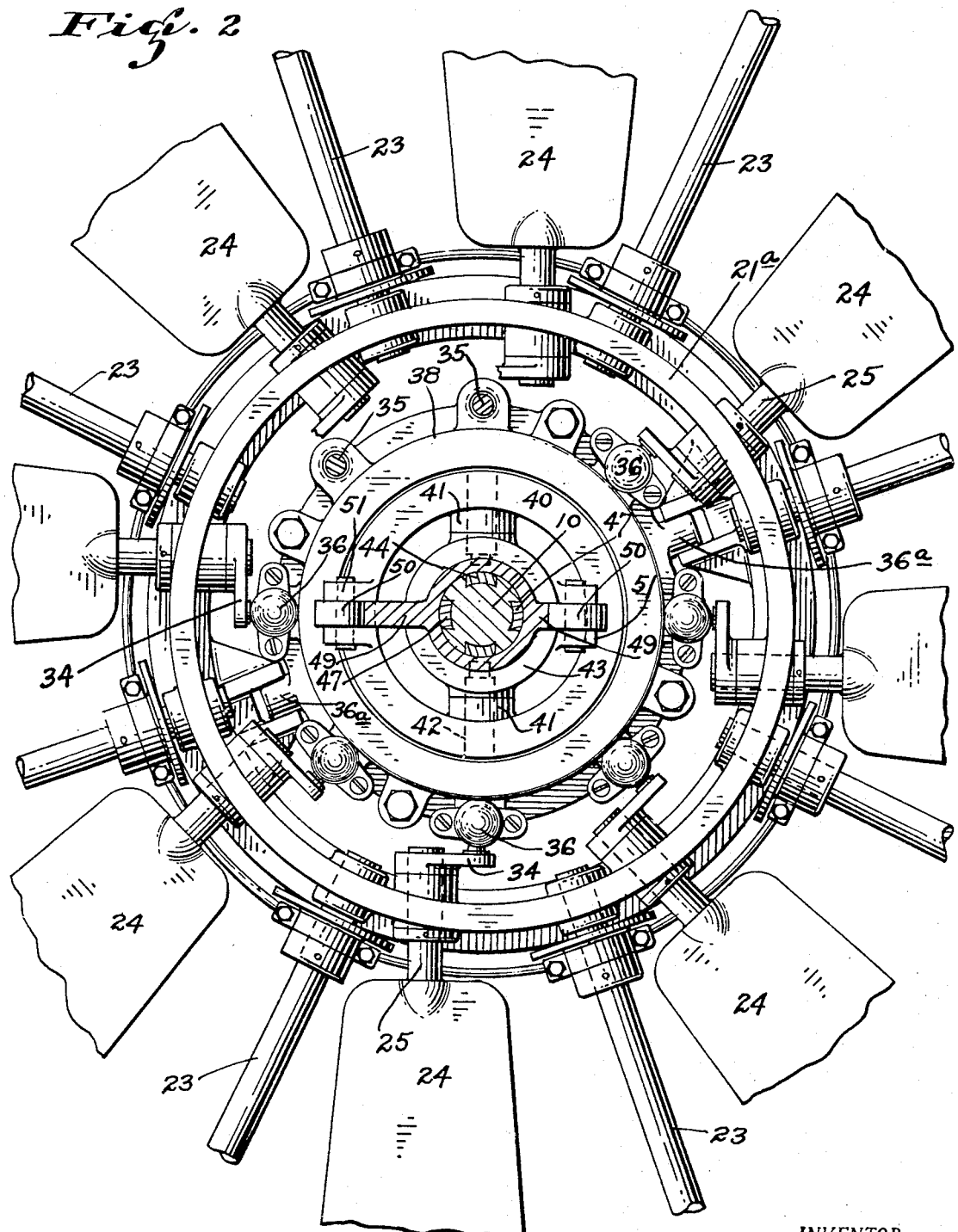
Fig. 2 is a section taken on the line II—II of Fig. 1.

Referring more particularly to the drawings, I show a main shaft 10 vertically disposed and adapted to be secured by means not shown to a body containing a pilot's cockpit disposed below. Journalled upon the shaft 10 by means of suitable bearings 11 is a bowl shaped support or driving member 12. A lower propeller unit generally indicated at A is supported by the upper edge of this driving member 12 and secured thereto in any suitable manner, as, for instance, by bolts 14. A cylindrical housing surrounds the shaft 10. This housing consists of an upper section 15 secured to the shaft as at 16, a lower section 17 similarily secured to the shaft at 18 and a central section 19 carried by three equally spaced radial arms 20 fixed at their inner ends to a collar 21 surrounding and secured to the shaft 10. The three sections of which the housing is composed are suitably spaced from each other to provide annular openings through which the propeller units extend and in which they revolve.

The upper propeller unit generally indicated at B is identical in construction to the lower propeller unit A and a description of one will, therefore, suffice for both.

Figure 3:
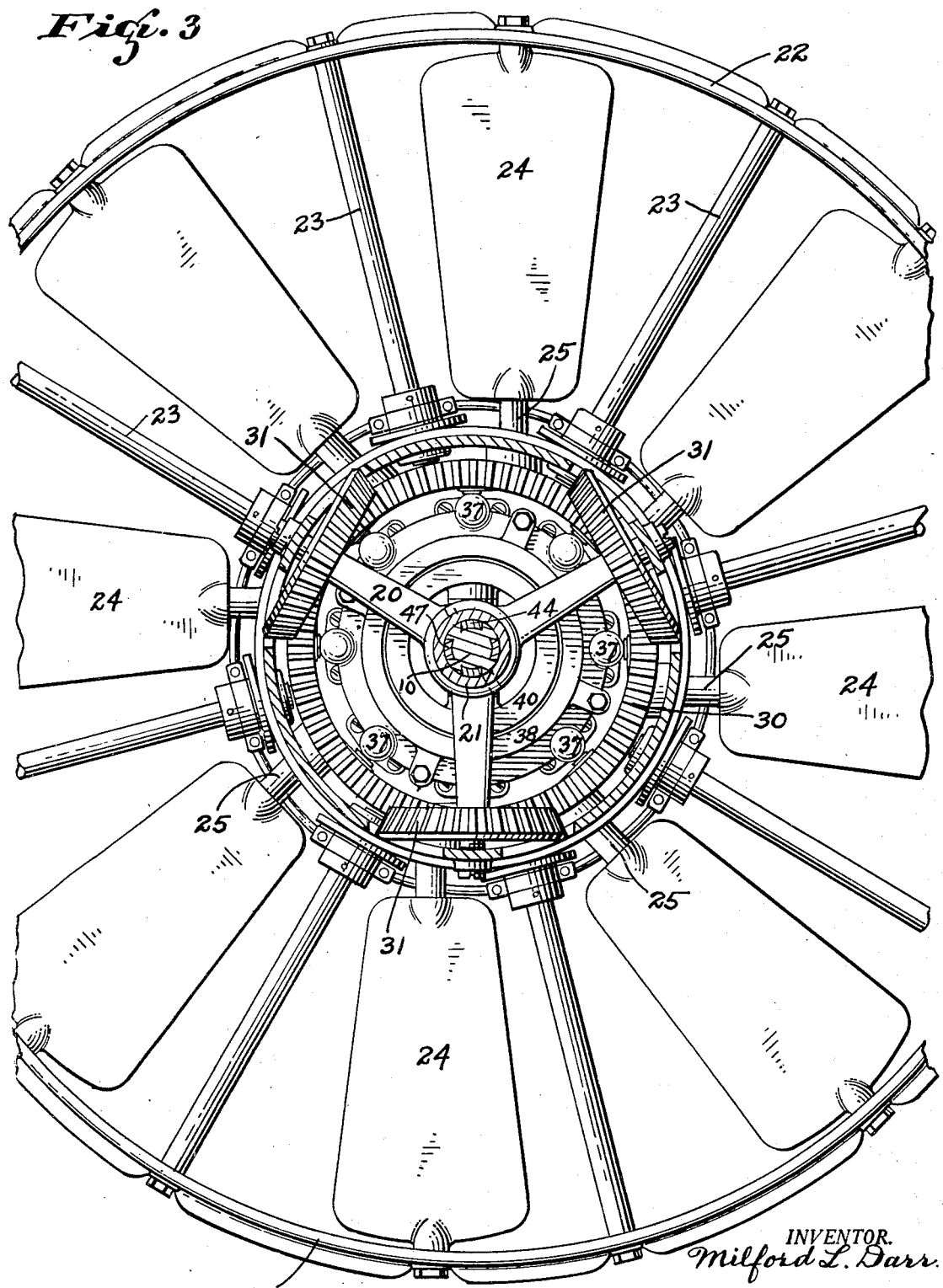
Fig. 3 is a plan view of the device with parts shown in section.

Referring particularly to Fig. 3, the propeller units are shown as consisting of an annular hub or ring 21a. Disposed concentrically with relation to the hub 21a and spaced therefrom is an outer rim 22. Spokes 23 are interposed between and serve to connect the hub 21a and rim 22. Disposed alternately with relation to the spokes 23 and carried for pivotal movement about their longitudinal axes are blades 24. These blades are connected at their outer ends to the rim 22 so as to be free for pivotal movement with relation thereto and are provided at their inner ends with trunnions 25 which extend through suitable bearings in the hubs 21a.

In order to revolve the propeller units A and B in opposite directions, suitable driving means, such for example as, an internal combustion engine, not shown, is connected to the driving member 12 by means of a drive shaft 26 and gears 27 and 28. When the driving member 12 is rotated by the driving means its rotary movement is directly imparted to the lower propeller unit A. The hub 21a of this unit is provided with an upwardly extending annular bracket 29, the upper edge of which is fitted with a beveled ring gear 30. This ring gear meshes with pinions 31, one of which is carried by each of the radial arms 20 and which in turn mesh with a ring gear 32 fixed to a bracket 33 which is carried by the hub 21a of the upper propeller unit B. Thus, the upper propeller unit is caused to rotate in a direction opposite to the direction of revolution of the lower propeller unit. When the propeller units are revolving in the above described manner, assuming that all of the blades therein are disposed at an equal pitch, a lifting force is obtained.

In order to establish a driving force, the pitch of each blade in one unit must be altered or increased during its travel through a portion of its revolution. The pitch of the blades in the other unit must similarly be altered as they pass through an arc that is diametrically opposed to the arc in which the pitch variation takes place in the first unit. In order to accomplish this, I provide the following means. The inner end of the trunnion 25 of each blade is provided with a crank arm 34. These crank arms 34 are articulately connected to links 35 by means of a ball and socket joint illustrated at 36. The opposite ends of the links 35 are connected by means of similar ball and socket joints 37 to the outer ring 38 of a ball race generally indicated at 39. The inner ring 40 of the ball race 39 is provided at diametrically opposite points with bosses 41, which bosses carry bearing pins 42 pivotally connecting the ball race to a collar 43 slidably mounted on the shaft 10. Hence, if the ball race is disposed in a horizontal position or in a position at right angles to the shaft 10, the propeller blades are held at equal constant pitch by means of the links 35 and crank arms 34. As the collar 43 is raised or lowered with relation to the shaft 10, the crank arms 34 are partially rotated by means of the links 35 with the result that the pitch of the blades is varied. Guide members 36a are secured to the brackets 29 and 33 and prevent oscillating movement of the links 35.

As the ball race 39 is rocked about its pivot 42 to assume a tilted position, each blade during a single revolution around the central shaft 10 will undergo a gradual change of pitch and upon completing the revolution will gradually assume its normal pitch, or the pitch at which it started. Thus, with the parts in the positions illustrated in Fig. 1, the blades on the right side of the upper unit and at the left side of the lower unit are practically horizontal, while the blades at the opposite sides of each unit are disposed in a vertical position or at a pitch of about 90 degrees. With the propeller units revolving and the blades thereof gradually changing during their revolution to assume the extreme pitches illustrated it is obvious that a driving force is obtained.

The means for varying the pitch of the blades is as follows. Four laterally extending splines are fitted in and equally spaced about the shaft 10. One pair of splines illustrated at 44 are connected by means of screws 45 or the like to the collar 43. An operating lever 46 is connected with the lower end of the splines 44 for imparting vertical movement to them. This vertical movement raises and lowers the collar 43 and consequently the ball races 39 with the result that the normal constant pitch of the propeller blades is varied. The other pair of splines are indicated at 47 and are similarly capable of being raised and lowered by means of an operating lever 48. Each of the splines 47 is provided with a pair of inclined cams 49. Upon raising and lowering of the splines these cams impart sidewise motion to rollers 50 which bear against them. The rollers 50 are carried by arms 51 fixed to the ball races 39. It will be noticed that the cams 49 which are disposed on opposite sides of the shaft 10 are inclined in opposite directions so that by moving the splines in a vertical direction, the ball races 39 may be caused to rock in either one direction or the other. The cams are also so positioned that the ball races are caused to rock toward each other on one side and away from each other on the other side in order that the blades in one propeller unit will attain their maximum pitch at a point diametrically opposite to the point at which the blades in the other propeller units attain their maximum pitch.

From the foregoing it is obvious that through manipulation of the simple levers 46 and 48 the propeller blades in both of the units A and B may be caused to revolve constantly at any desired pitch or, while rotating, their pitch may be gradually changed, the change of pitch affecting each blade as it passes through a predetermined arc of its cycle of revolution.

It will be understood from the foregoing that my invention may be applied to many types of aircraft and is not limited in application to any particular form of machine, and while I have shown a preferred form of my invention, it should also be understood that various changes may be resorted to in the design and construction of its several parts within the spirit and scope of the appended claims.

Having thus described my invention what I claim and desire to secure by Letters Patent is:

1. An aircraft propeller unit comprising a main shaft, propeller blades mounted for revolution about the main shaft, each of said blades being mounted for rotation about its longitudinal axis to permit pitch adjustment, a crank arm on the inner end of each blade, a bearing member surrounding the main shaft and longitudinally movable with relation thereto, cams on the main shaft engageable by said bearing to tilt the bearing when it is moved longitudinally, and means connecting said crank arms and said bearing member whereby movement of the bearing member will vary the pitch of the propeller blades.

2. An aircraft propeller unit comprising a main shaft, propeller blades mounted for revolution about the main shaft and for pivotal movement about their longitudinal axes to vary their pitch, a crank arm on the inner end of each blade, a bearing member surrounding the main shaft and mounted for reciprocal motion thereon, cams on said main shaft engageable by said bearing members to cause them to tilt with relation to the main shaft, and means articulately connecting said bearing member with said crank arms, whereby reciprocal motion of said bearing member will vary the pitch of the blades and tilting of the bearing member will cause the pitch of each blade to gradually change as it revolves about the main shaft.

3. An aircraft propeller unit comprising a main shaft, blades mounted for revolution about the main shaft, a pair of splines disposed at opposite sides of the main shaft, a bearing member surrounding the main shaft and supported by said splines, a crank arm on the inner end of each blade, a connection between said crank arms and the bearing, and means for sliding said splines longitudinally of the main shaft to move said bearing and effect the pitch of said blades.

4. An aircraft propeller unit comprising a main shaft, blades mounted for revolution about the main shaft, a pair of splines disposed at opposite sides of the main shaft, a bearing member surrounding the main shaft and supported by said splines, a crank arm on the inner end of each blade, a connection between said crank arms and the bearing, means for sliding said splines longitudinally of the main shaft to move said bearing and effect the pitch of said blades, and a second pair of splines on the main shaft supporting cam means engageable with said bearing to tilt the same upon movement of the said second splines longitudinally of the main shaft.

5. An aircraft propeller unit comprising a main shaft, blades mounted for revolving movement about the main shaft, a bearing member surrounding the main shaft and pivoted for tilting movement relative to the shaft, a crank arm fixed to each blade and connections between said crank arms and said bearing member whereby tilting of the bearing member will cause the pitch of the blades to change as they revolve, means for moving said bearing member longitudinally of the main shaft and cam members engageable by the bearing member upon longitudinal movement thereof to cause the bearing member to tilt.

MILFORD L. DARR.